(12) United States Patent
Russell

(10) Patent No.: US 10,066,194 B2
(45) Date of Patent: Sep. 4, 2018

(54) BODY MOULDING SOLUTIONS

(71) Applicant: M.M.Z. Solutions Pty Ltd, Sandy Bay, Tasmania (AU)

(72) Inventor: Mark J. Russell, Midway Point (AU)

(73) Assignee: M.M.Z. Solutions Pty Ltd, Sandy Bay, Tasmania (AU)

( * ) Notice: Subject to any disclaimer, the term of this patent is extended or adjusted under 35 U.S.C. 154(b) by 34 days.

(21) Appl. No.: 15/361,930

(22) Filed: Nov. 28, 2016

(65) Prior Publication Data

US 2017/0152463 A1 Jun. 1, 2017

Related U.S. Application Data

(60) Provisional application No. 62/260,364, filed on Nov. 27, 2015.

(51) Int. Cl.
| | | |
|---|---|---|
| *C11D 3/18* | (2006.01) | |
| *C11D 7/50* | (2006.01) | |
| *B32B 38/10* | (2006.01) | |
| *B32B 43/00* | (2006.01) | |
| *C11D 7/44* | (2006.01) | |

(52) U.S. Cl.
CPC ............ *C11D 7/5027* (2013.01); *B32B 38/10* (2013.01); *B32B 43/006* (2013.01); *C11D 7/44* (2013.01); *B32B 2605/00* (2013.01)

(58) Field of Classification Search
CPC .................................................... C11D 7/5027
USPC .................................................. 510/109, 407
See application file for complete search history.

(56) References Cited

U.S. PATENT DOCUMENTS

| | | | |
|---|---|---|---|
| 2013/0174870 A1* | 7/2013 | Dorton | C11D 7/5027 134/10 |
| 2015/0075561 A1* | 3/2015 | Dorton | C11D 7/5027 134/10 |

FOREIGN PATENT DOCUMENTS

CN 105779035 A * 7/2016

* cited by examiner

*Primary Examiner* — Gregory Webb
(74) *Attorney, Agent, or Firm* — Michael Best & Friedrich LLP

(57) ABSTRACT

A solution for use in removing a double sided adhesive tape from moldings and which can have the further property of conditioning the molding for re-use. The solution comprising an admixture of ingredients which can synergistically function to give the desired properties and advantages. The mixture comprising:
(a) a ratio of about 1:1 of Kerosene:Diesel;
(b) 1 to 10% by vol. of an additive comprising a highly aromatic hydrocarbon solvent; and
(c) 0 to 10% by vol. of perfume.

7 Claims, No Drawings

BODY MOULDING SOLUTIONS

TECHNICAL FIELD

The present invention relates to the repair of motor vehicles, boats, caravans and like conveyances which have body mouldings.

BACKGROUND OF THE INVENTION

Body mouldings are the strips of rubber, metallic or painted embellishments which are fitted to the exterior surfaces of a conveyance, such as a vehicle, and which often have the added function of providing a degree of protection from damage which would otherwise occur from bumping or similar light contact against the exterior surface. Such body mouldings are generally fitted with a double sided adhesive tape. The adhesive used is of sufficient gripping power to prevent easy removal of the moulding from the vehicle, but which provides maximum adherence between the moulding and the tape itself, to thus enable the moulding to be peeled from the vehicle while the tape remains adhered to the moulding.

In the repair of conveyances such as motor vehicles, the body moulding is generally the first item to be removed from the damaged panel. The moulding is often suitable for re-use once the panel has been fixed and refitted, however, before the moulding can be re-used, the double sided adhesive tape must be removed. This is usually a time consuming and expensive operation. There are basically four ways of doing this, viz by grinding, using a solvent, hot blowing or using a razor blade or a thumb.

Recent developments in body mouldings have seen changes in the materials used in the mouldings due to a desire for improved aesthetics, changes in manufacturing processes and more accessibility to raw materials. The materials from which body mouldings are formed has shifted to include not only the traditional polyurethanes, but also thermoplastic polyolefins. The removal of double sided tape from these new materials can require new techniques due to the different way in which these materials behave.

Grinding with a grinding wheel can be used to remove double sided tape, but it frequently damages the moulding or leaves an undesirable surface on the moulding which means that the moulding cannot in some cases be properly re-fitted and is subject to falling off. Grinding is, furthermore, a messy and polluting operation and requires the use of a solvent to clean the area which has been ground. Solvents are not only a safety hazard due to fire and fumes, but can only be used on non-painted mouldings. Overall, grinding is a time consuming and expensive operation.

The use of solvents per se is often resorted to in order to prevent any damage to the moulds occurring. Large quantities of solvent have to be applied to be effective which results in wastage, as a good portion cannot be re-used. Furthermore, solvents can present a high fire risk. It is also a messy operation to use solvents requiring a large work area, and operators get their hands covered in glue and solvent. Furthermore, as mentioned above, solvents are limited in their use to non-painted mouldings since they tend to damage paint.

Hot blowers are machines used to heat the adhesive strip to soften the adhesive and thereby permit the strip to be pulled from the molding. Such blowers are expensive and frequently damage the moulding. Hot blowers are not in wide use.

Scraping with a razor blade or thumb has the disadvantage that the operator can end up with blisters or cut fingers. It is also a time-consuming process and therefore expensive.

SUMMARY OF THE INVENTION

According to the present invention, there is provided a solution for use in removing the double sided adhesive tape from mouldings and which can have the further property of conditioning the moulding for re-use. The solution comprises an admixture of ingredients which can synergistically function to give the desired properties and advantages. The mixture comprises:
  (a) a ratio of about 1:1 of Kerosene:Diesel;
  (b) 1 to 10% by vol. of an additive comprising a highly aromatic hydrocarbon solvent; and
  (c) 0 to 10% by vol. of perfume.

Vehicle body mouldings which may be treated with the mixture include modified polypropylene, soft and flexible polyurethane, polyamide, acrylonitrile-butadiene-styrene, polycarbonate, polyphenylene-oxide, polymer, and polybutylene-terephthalate-polymer mouldings.

The thickness of the body mouldings can be in the range of from about 8 to 20 mm, preferably 15 to 20 mm. In an embodiment, the thickness of the moulding is greater than about 3, 5, 8, 10, 15 or 18 mm. It has been found that under some circumstances, mouldings that have poarts that are about 3 mm (hollow cavity) are not particularly suitable for treatment by the solution, since they may not thick enough.

The solution is particularly suitable for use with vehicle body mouldings formed from thermoplastic olefins (TPO).

In use, the body moulding covered with at least some of the double sided adhesive tape can be brought into contact with the solution to remove the tape. The solution can be poured onto the moulding. In an embodiment, the moulding can be immersed into a container of the solution. In an embodiment, the moulding is immersed in a container of the solution and let stand for a predetermined period of time. Preferably, the predetermined period of time is sufficient to allow removal of at least some of the tape. Preferably, at least 90, 95, 98 or 100% of the tape can be removed. The predetermined period of time can be at least 1, 2, 3, or 4 hours. The body moulding can then be removed from the solution and the double sided tape can be removed. The removal can be by abrasion. The removal can be by peeling off by hand optionally in one action. The moulding can be dried e.g. with a rag. Once the moulding is dry, a new double sided adhesive tape can be applied prior to refixing the moulding to the vehicle.

Thus, the invention also provides a method of treating a vehicle body moulding to remove double sided adhesive tape from the vehicle body mouldings, the method comprising the steps of:
  immersing the vehicle body moulding into a solution comprising:
    (a) a ratio of about 1:1 of Kerosene:Diesel;
    (b) 1 to 10% by vol. of an additive comprising a highly aromatic hydrocarbon solvent; and
    (c) 1 to 10% by vol. of perfume.
  optionally, the method further includes the step of preparing the solution prior to its use;
  waiting a period of time sufficient for the solution to have an effect of the double sided adhesive tape;
  removing the vehicle body moulding from the solution; and
  removing the double sided tape.

The solution may be reusable and wastage may be negligible. The vehicle body moulding can be reconditioned, provided the moulding remains undamaged. There can be a lower fire risk than with conventional solvents and minimal time can be involved by the operator as he can be attending to other matters while the solution is working.

Kerosene is a thin, clear liquid formed from hydrocarbons obtained from the fractional distillation of petroleum between 150° C. and 275° C., resulting in a mixture with a density of 0.78-0.81 g/cm$^3$ composed of carbon chains that typically contain between 6 and 16 carbon atoms per molecule. Kerosene's major components are branched and straight chain alkanes and naphthenes (cycloalkanes), which normally account for at least 70% by volume. Aromatic hydrocarbons in this boiling range, such as alkylbenzenes (single ring) and alkylnaphthalenes (double ring), do not normally exceed 25% by volume of kerosene streams. Olefins are usually not present at more than 5% by volume. The flash point of kerosene is between 37 and 65° C. and its autoignition temperature is 220° C. The pour point of kerosene depends on grade, with commercial aviation fuel standardized at −47° C. The kerosene can be a straight cut kerosene.

Petroleum diesel, also called petrodiesel, or fossil diesel is the most common type of diesel fuel. It is produced from the fractional distillation of crude oil between 200° C. and 350° C. at atmospheric pressure, resulting in a mixture of carbon chains that typically contain between 8 and 21 carbon atoms per molecule. The diesel fuel can be a BP® Diesel Fuel.

The kerosene and diesel may be present in approximately equal volumes. It has been found that a 1:1 (kerosene:diesel) ratio provides the best results. Whilst a ratio of 1:1 is described, it should be understood that minor variations in amounts can be tolerated without departing from the ability of the solution to have an effect. The ratio could be increased to 1 to 1.1, 1.2, 1.3, 1.4 or 1.5 (kerosene:diesel) but any higher and the body moulding may start to exhibit degradation in the form of swelling. Swelling of the body moulding is undesirable.

The solution comprises an additive. The additive may comprise an aromatic hydrocarbon component having a viscosity at 40° C. (ASTM D445 or EN ISO 3104} below 2 mm$^2$/s. The aromatic hydrocarbon component may contain benzene (determined by gas chromatography). An example of a particularly preferred aromatic hydrocarbon component is ShellSol A150 (available from Shell companies), which is a stream of C9-11 hydrocarbons with an aromatics content exceeding 99% v/v (i.e. consisting essentially of C9-11 aromatic hydrocarbons). ShellSol A100 could also be used. Alternative hydrocarbon components are toluene and xylene. Based on the total volume of the solvent mixture, an aromatic hydrocarbon component may be present in an amount in the range of from 1 to 10% vol., more preferably 1 to 5% vol. The aromatic hydrocarbon can be present in an amount of at most 1, 2, 3, 4, 5, 6, 7, 8, 9 or 10% by vol. The aromatic hydrocarbon component in the solvent mixture has been found to help keep the viscosity of the solution low. More than 10% vol could be used provided the viscosity is kept low.

A surface active agent can be added to the solution if desired. The surface active agent can be selected to reduce the interfacial tension between the solution and the surface of the body moulding, while promoting a sheen on the vehicle moulding to which it is applied. To this end, products such as vegetable oils having similar properties to linseed and castor oils, can be preferred. The most preferred surfactant is castor oil itself. Castor oil is a non-drying oil having a specific gravity of 0.945-0.965 @ 25° C., a saponification value of 178, iodine value 85, fp-10° C., a flash point of 229° C., and an autoignition temperature of 448° C.

The solution can include additives designed to improve safety and or deodorant masking characteristics. For safety purposes, a dye may be incorporated. Once the solution has been dyed, it can be more apparent that the solution is for commercial purposes. For deodorant masking, a perfume may be incorporated, although perfume is optional. Generally, there is a single perfume additive present in the composition. The preferred perfumes are GUMLEAF AROMATICS/PINEAPPLE FRAGRANCE (manufactured by Gumleaf Aromatics Australia Pty Ltd), TEATREE OIL, EUCALYPTUS OIL and DEODALL no. 1 (manufactured by Givaudan-Roure Pty Limited, Australia). These products mask a wide range of odours and are particularly suitable for masking kerosene odours. DEODALL no. 1 comprises a complex proprietary mixture of fragrance materials and has a specific gravity of 0.875 @25 DEG C., a refractive index of 1.473 @ 20 DEG C. and a flash point of 100 DEG C. Based on the total volume of the solvent mixture, a perfume may preferably be present in an amount in the range of from 0 to 10% vol, more preferably 1 to 5% vol. The aromatic hydrocarbon can be present in an amount of at most 0 (i.e. not present), 1, 2, 3, 4, 5, 6, 7, 8, 9 or 10% by vol. More than 10% vol perfume could be added, but it is likely unnecessary since the fragrance will be apparent at lower levels.

Preferred embodiments of the invention are described in the following examples.

DESCRIPTION OF PREFERRED EMBODIMENTS

Example 1

Solution I (200 liters):
  50% BP Diesel Fuel
  30% Straight Cut Kerosene
  10% Eucalyptus oil
  10% Shell Sol 150
Solution II (200 liters):
  45% BP Diesel Fuel
  45% Straight Cut Kerosene
  5% Eucalyptus oil
  5% Shell Sol 150

Soft body mouldings having an adhesive tape adhered thereto were immersed in each of the above solutions and removed at hourly periods to determine whether the adhesive tape could be peeled therefrom. Any swelling in the body moulding was simultaneously noted.

It was found that the polyurethane and thermoplastic olefin body mouldings treated with solution no. I required 8 hours of soaking before the tape could be removed. This time frame is too long for repair workshop practice. Swelling also occurred.

The body mouldings treated with solution no. II took 3 hours of soaking before the tape could be readily removed. The solution did not affect the body mouldings.

Example 2

45% BP Diesel Fuel
  45% Straight Cut Kerosene
  10% Shell Sol 150

It was found that the polyurethane and thermoplastic olefin body mouldings treated with the solution took about 3 hours of soaking before the tape could be readily removed. The solution did not affect the body mouldings.

Example 3

49.5 BP Diesel Fuel
49.5% Straight Cut Kerosene
1% toluene

It was found that the polyurethane and thermoplastic olefin body mouldings treated with the solution took about 3 hours of soaking before the tape could be readily removed. The solution did not affect the body mouldings.

It is to be understood that, if any prior art publication is referred to herein, such reference does not constitute an admission that the publication forms a part of the common general knowledge in the art, in Australia or any other country.

In the claims which follow and in the preceding description of the invention, except where the context requires otherwise due to express language or necessary implication, the word "comprise" or variations such as "comprises" or "comprising" is used in an inclusive sense, i.e. to specify the presence of the stated features but not to preclude the presence or addition of further features in various embodiments of the invention.

The invention claimed is:

1. A solution for use in removing the double sided adhesive tape from vehicle body mouldings, the solution comprising:
    (a) a ratio of about 1:1 of Kerosene:Petroleum Diesel; wherein the Petroleum Diesel is present in an amount not more than about 49.5% vol.;
    (b) 1 to 10% by vol. of an additive comprising a complex combination of hydrocarbons obtained from distillation of aromatic streams, consisting predominantly of aromatic hydrocarbons having carbon numbers predominantly in the range of C9 through C16 and boiling in the range of approximately 165° C. to 290° C.; and
    (c) 0 to 10% by vol. of perfume.

2. A solution according to claim 1, wherein the additive comprising a complex combination of hydrocarbons obtained from distillation of aromatic streams is present in an amount of at most 5% by vol.

3. A solution according to claim 1, wherein the solution comprises:
    (a) 45% vol. Petroleum Diesel
    (b) 45% vol. Straight Cut Kerosene
    (c) 5% vol. Eucalyptus oil
    (d) 5% vol. of additive comprising a complex combination of hydrocarbons obtained from distillation of aromatic streams, consisting predominantly of aromatic hydrocarbons having carbon numbers predominantly in the range of C9 through C16 and boiling in the range of approximately 165° C. to 290° C.

4. A solution according to claim 1, when used to remove double sided adhesive tape from a vehicle body moulding comprising a thermoplastic olefin.

5. A solution according to claim 4, wherein the thermoplastic olefin has a thickness greater than about 8 mm.

6. A solution when used to remove double sided adhesive tape from a vehicle body moulding comprising a thermoplastic olefin, the solution comprising:
    (a) 45% vol. Petroleum Diesel
    (b) 45% vol. Straight Cut Kerosene
    (c) 5% vol. Eucalyptus oil
    (d) 5% vol. of additive comprising a complex combination of hydrocarbons obtained from distillation of aromatic streams, consisting predominantly of aromatic hydrocarbons having carbon numbers predominantly in the range of C9 through C16 and boiling in the range of approximately 165° C. to 290° C.

7. A solution for use in removing the double sided adhesive tape from vehicle body mouldings, the solution comprising:
    (a) a ratio in the range of from 1:1 to 1:1.5 Kerosene:Petroleum Diesel; wherein the Petroleum Diesel is present in an amount not more than about 49.5% vol.;
    (b) 1 to 10% by vol. of an additive comprising a complex combination of hydrocarbons obtained from distillation of aromatic streams, consisting predominantly of aromatic hydrocarbons having carbon numbers predominantly in the range of C9 through C16 and boiling in the range of approximately 165° C. to 290° C.; and
    (c) 0 to 10% by vol. of perfume.

\* \* \* \* \*